United States Patent [19]
Thene et al.

[11] 3,935,124
[45] Jan. 27, 1976

[54] ANTI-STICK COMPOSITION FOR COATING AND DETACKIFYING UNCURED RUBBER ARTICLES AND THE LIKE

[75] Inventors: Donnie R. Thene, Elberfeld; Robert J. O'Donoghue, Indianapolis; Donald W. Terry, Noblesville, all of Ind.

[73] Assignees: Miller Chemical Corporation, Evansville; Mid-State Chemical & Supply Corporation, Indianapolis, both of Ind. ; part interest to each

[22] Filed: Jan. 2, 1974

[21] Appl. No.: 429,854

[52] U.S. Cl. .................. 252/382; 106/2; 252/131; 252/383; 260/814; 260/816; 427/384
[51] Int. Cl.² .................... C08J 7/04; C08C 1/02
[58] Field of Search ........... 252/382, 383, 384, 385, 252/430, 431 C, 128, 131; 117/139; 260/814, 816; 106/2; 427/384

[56] References Cited
UNITED STATES PATENTS

| | | | |
|---|---|---|---|
| 3,002,840 | 10/1961 | Kern et al. | 106/2 |
| 3,591,410 | 7/1971 | Ross | 252/384 |
| 3,765,911 | 10/1973 | Knowles et al. | 106/2 |

Primary Examiner—Leland A. Sebastian
Assistant Examiner—Irwin Gluck

[57] ABSTRACT

A liquid anti-stick coating composition for coating and detackifying solid articles of uncured elastomeric materials, such as uncured rubber pellets, initially having sticky or tacky surface properties. The composition basically consists of an aqueous slurry containing a substantial proportion of finely divided particles of a kaolin clay, a sufficient amount of a water-soluble soap to provide bridging and tieing between the charge sites on the kaolin particles and the tacky surfaces of the uncured articles to thereby adhere a layer of a kaolin particles to the tacky surfaces, and a sufficient amount of water to disperse the clay particles. The coating composition may also include a dispersing and viscosity improving component such as sodium polyphosphate or a mixture of the latter and sodium sulfate for the purpose of maintaining the clay particles in suspension and maintaining the viscosity of the slurry at a workable level.

29 Claims, No Drawings

ANTI-STICK COMPOSITION FOR COATING AND DETACKIFYING UNCURED RUBBER ARTICLES AND THE LIKE

BACKGROUND OF THE INVENTION

1. Field Of The Invention

This invention relates generally to the field of processing of materials, such as uncured rubber pellets, which have sticky surface properties. More particularly, the invention relates to anti-stick coating compositions useful as a parting of detackifying agent for preventing solid articles having sticky surface properties from sticking to one another during the processing of the same.

2. Description Of The Prior Art

Many synthetic and naturally occurring polymeric elastomeric materials are manufactured in an uncured stage for subsequent use in the manufacture of products such as tubing, belts, tires, rubber sheeting and the like. In the production of the final product, the uncured materials are subjected to curing or vulcanization in an appropriate molding apparatus or press. The handling of such uncured materials in mechanical processing equipment and the storage thereof is extremely difficult because of the tackiness, or stickiness, of the materials in their uncured stage. Accordingly, many attempts have been made, in the past, to develop some means for rendering the uncured articles less tacky without substantially interfering with the subsequent curing or vulcanizing operations and without substantially altering the physical characteristics of the resultant product.

One method previously attempted consisted of applying a particulate material such as talc, starch, cellulose fibers, vinyl aromatic polymer dust, or hydrophobic silica powder directly to the uncured pellets or articles. The principal difficulties involved in such a procedure is that it is practically impossible to apply an even coating of the material, and dusting problems are severe. This latter factor of course presents two problems, one being the safety hazard and the other being the excess cost of wasted materials.

Another prior art method for detackifying uncured rubber stock and the like comprised the incorporation directly into the rubber composition of an internal lubricating material. Of course it will readily be apparent to one of ordinary skill in the art to which the present invention pertains that such a method would involve additional processing steps and the use of relatively expensive materials. Moreover, it would be necessary for the lubricating material to be dispersed throughout the entirety of the uncured rubber pellets and accordingly, the total quantity present at the time of cure would be much greater than in the case of an external coating. Moreover, the problems involved in selecting a compatible material which could be utilized as a lubricant but which would not affect the final properties of the cured article are manifest. Lubricated materials also are difficult to handle in some processing apparatuses, such as, for example, vertical screw conveyors.

Yet another prior art method for detackifying uncured pellets comprised the coating of each pellet with a continuous outer film of a hard, non-tacky material such as polyethylene or the like. Again, the obvious shortcomings are apparent because such procedure would involve expensive processing steps and the compatibility or lack thereof of the coating film with the rubber compound would add another variable to subsequent processing operations.

A known prior art liquid anti-tack composition which utilizes bentonite clay is disclosed in U.S. Pat. No. 3,765,911 which issued on Oct. 16, 1973 to Knowles et al. The Knowles et al. composition is described as necessarily including a strong gelling grade of bentonite as opposed to ordinary or non-gelling grades of this material. Moreover, the Knowles et al. compositions also necessarily include either a water soluble salt of an alkyl ether sulfate or a water soluble salt of an alkyl alcohol sulfate. In each of the specific compositions described in the Knowles et al. disclosure, the quantity of soap is much greater than the overall quantity of bentonite. In particular, the utility of the Knowles et al. compositions is extremely limited because of this necessity for inclusion of a strong gelling grade of bentonite coupled with a large proportion of soap with respect to the amount of bentonite present and this latter factor contributes to the necessity for using slurries containing relatively low concentrations of the bentonite component. Even in Example V of Knowles et al., the total amount of clay in the slurry amounts to only approximately 6.6 times the amount of pale oleine oil saponified to produce the soap component. Moreover, the composition exemplified in Example V of the Knowles et al. disclosure also includes large relative quantities of sodium/ether sulfate (anhydrous) and sodium nitrite. al. the exact basis for the inclusion of these latter two components is not particularly clarified in the Knowles et al disclosure, it seems reasonable to assume that they were included for the purpose of providing a composition having operable physical properties.

It is also to be noted that the compositions exemplified by Knowles et al. are described as being in a concentrate form and substantial dilution with water is intended. At column 6, line 26, Knowles et al. suggest a 10-fold dilution as resulting in loss of stability of the colloidial dispersion; however, there is no disclosure at all with respect to exactly how much dilution is permissible. Accordingly, there really is no way to tell from the Knowles et al. disclosure just how much clay is intended in the composition as the same is applied to articles to be detackified.

SUMMARY OF THE INVENTION

In accordance with the concepts and principles of the present invention, the various shortcomings and difficulties experienced in utilizing prior art processes and compositions are substantially overcome through the use of a liquid composition for coating and thereby detackifying solid articles of uncured elastomeric material initially having tacky surface characteristics. The basic composition comprises an aqueous slurry consisting essentially of: (1) a substantial proportion of finely divided particles of a kaolin clay; (2) a sufficient amount of a water-soluble soap to provide bridging and tieing between the charge sites on the kaolin particles and the tacky surfaces of the uncured articles to thereby adhere a layer of kaolin particles to the tacky surfaces; and (3) a sufficient amount of water to disperse the clay particles. In a slightly narrower sense, it is the intent of the invention to provide a concentrated composition which is dilutable with water to present a coating for detackifying solid articles of uncured elastomeric materials initially having a tacky surface characteristics as outlined above. In this aspect of the invention, the original concentrated composition contains 50–75% by weight of the kaolin clay. In any event, the composition actually used for coating and detackifying solid articles of uncured elastomeric materials preferably contains at least about 5 weight percent of a kaolin clay.

In its more specific aspects, the invention contemplates the use of a soap selected from the group consisting of alkali metal salts, alkaline earth metal salts and amine salts of organic carboxylic acids having at least six carbon atoms, and mixtures thereof. Moreover, the preferred kaolin clay is kaolinite.

Preferably the weight ratio of clay particles to soap in accordance with the present invention should be in the range of from 10:1 to 150:1. Moreover, the preferred soap is derived from a fatty acid component having a titer in the range of from about 40°–50° C and even more particularly, the preferred soap basically comprises a saponified tallow component. A soap designated Saratoga soap, which is specifically described hereinbelow, is the particularly preferred material for use as the soap component which should preferably be present in the concentrated slurry in an amount ranging from approximately 0.5 to 5.0 weight percent.

In commercial applications, it is often desirable to include, in the concentrated compositions provided by the present invention, a sufficient amount of a dispersing and viscosity improving component to maintain the clay particles in suspension and maintain the viscosity of the slurry at a workable level. In this connection, in concentrated compositions which contain approximately 61–70% by weight of the kaolin clay component, a viscosity of approximately 3200–3900 cps. as measured with a Brookfield No. 4 spindle at 50 rpm and a specific gravity of approximately 1.5 to 1.56 have been found to be operable, although the principal criteria is only that the concentrated material be pourable from the bung hole of a conventional shipping drum.

In accordance with the invention summarized above, it has been hypothesized and is presently believed that the soap acts as a bridging and tieing component for adhering the clay particles to the surfaces of the uncured articles of rubber or other elastomeric material. It has been found that the mere contacting of uncured tacky articles with dry clay particles results in extremely uneven coatings including bare spots and the clay particles are so lightly adhered to the tacky articles that severe dusting problems are encountered. The soap component, however, apparently is capable of adhering to the tacky surfaces of the uncured articles and attracting the charge sites of the kaolin clay whereby the soap operates to present a bridge between the surfaces of the uncured articles and the clay particles and the latter are thereby tied to the surfaces of the uncured articles strongly enough to cause a layer of the clay particles to adhere to the tacky surfaces and dusting is prevented.

In making the present invention, it was totally unexpected that kaolin clays would apparently possess a vastly lesser number of charge sites than bentonite clay whereby much less soap is necessary to bind the kaolin clay to the surfaces of the uncured articles than is required for binding bentonite clay to such surfaces. This provides the secondary unexpected result that the lower soap concentrations possible in kaolin clay slurries, permit the utilization of greater clay concentrations in commercial concentrated slurries than is possible where bentonite clay and the necessarily greater quantities of soap are utilized. Accordingly, commercial concentrated slurries containing as much 75% by weight kaolin clay particles have been found practical.

Still another factor to be considered in connection with the compositions of the present invention as compared to the slurries of Knowles et al. discussed above, is that it has not been found necessary to include a synthetic detergent such as a water soluble salt of an alkyl ether sulfate or a water soluble salt of an alkyl alcohol sulfate to produce an operable composition.

DESCRIPTION OF THE PREFERRED EMBODIMENTS

In accordance with the present invention, a liquid composition for coating and thereby detackifying solid articles of uncured elastomeric materials unitially having tacky surface characteristics is provided. The composition comprises an aqueous slurry which consists essentially of a substantial proportion of finely divided particles of a kaolin clay, a sufficient amount of a water-soluble soap to provide bridging and tieing between the charge sites on the kaolin particles and the tacky surfaces of the uncured articles to thereby adhere a layer of kaolin particles to the tacky surfaces, and a sufficient amount of water to disperse the clay particles. In a more commercial form, the invention is directed to a concentrated composition which is dilutable with water to present such a coating for detackifying solid articles of uncured elastomeric materials having tacky surface characteristics. This concentrated composition generally comprises an aqueous slurry containing 50–75% by weight of the kaolin clay. In its more preferred form, the concentrate of the present invention contains 61–70% clay. The concentrated slurries are dilutable with water and in actual practice slurries with clay concentrations as low as about 5% by weight may be utilized for coating and thereby detackifying solid articles of uncured elastomeric materials which initially have tacky surface properties.

While all kaolin clays are useable in connection with the present invention, kaolinite is the preferred kaolin clay. Kaolinite is a hydrated aluminum silicate with an ideal structural formula of $(OH)_8Al_4Si_4O_{10}$ and a composition of 46.5% $SiO_2$; 39.5% $Al_2O_3$; and 14% $H_2O$. Kaolinite is classified as a layer silicate material. The basic structural units in layer silicates are silica sheets and alumina sheets. In kaolinite, these two sheets are combined with a layer of silica tetrahedral units joined with a layer of aluminum octahedral units, both sheets sharing a common layer of oxygen atoms and hydroxyl groups. Kaolinite, because of its unique properties, is the preferred kaolin material for use in the present invention; however, other minerals in the kaolin group which operate similarly to kaolinite are nacrite, dickite and halloysite.

Per contra, montmorillonite (or bentonite) is a hydrated sodium, calcium, iron, magnesium aluminum silicate. This mineral is also a layer silicate but the basic layer is comprised of three sheets; an alumina octahedral sheet joined on both sides with a silica tetrahedral sheet. Montmorillonite is classed as a three layer mineral. Other three layer clay minerals include smectite, nontronite, saponite, hectorite, illite, and vermiculite. Other clay minerals which are classed as layer silicates generally are chlorite, sepiolite, attapulgite, palygorskite, talc, and pyrophyllite.

Kaolinite has several distinctive physical chemical properties which make it an extremely important industrial mineral. It is white or near white in color, very fine in particle size, plate shaped, soft (hardness of a fingernail) and non-abrasive. Kaolinite is also relatively chemically inert between a pH of 4 and 10 and has a relatively low viscosity at high solids content when dispersed in water. Kaolinite is hydrophilic and easily dispersed in water and with the aid of a small amount of a dispersing agent, such as sodium polyphosphate, kaolinite can be dispersed in water to form a slurry containing more than 70% solids which will flow like milk. Without the dispersing agent, floculation may occur because the edge of the kaolin layer has a positive charge and the surface of the sheet has a negative charge. Accordingly, the edge of one particle is attracted to the sheet surface of another particle and a house of cards type of flocculation occurs, presenting a high viscosity slurry.

Bentonite, on the other hand, can be tan, brown, buff, gray or white in color. It is exceedingly fine in particle size and swells in volume when placed in water because it absorbs water between the layers of one sheet and the layers of another. The charges on the edge are positive and those on the surface are negative. Cations such as sodium and calcium are attracted and held on the layer surface. Bentonite can be dispersed in slurries containing very low solids content (maximum approximately 10%) because the same is extremely viscous and has thixotropic qualities. Because of this high viscosity and such thixotropic properties, bentonite is often used as a gellant in many applications. Accordingly, it can be seen that kaolinite and bentonite are extremely different in their properties and have very different industrial uses.

In any event, the primary and critical difference between kaolin clays and bentonite for purposes of the present invention is that the latter features a greater surface charge and a vastly greater number of charge sites on its surface than do kaolin clays and this feature leads to the unexpected result that kaolin clays can be adhered to uncured tacky surfaces with a vastly lesser quantity of soap than can bentonite or the like.

Several different kaolin materials have been tested in connection with the present invention; and each has provided good results. However, the most preferred clay composition is WP grade kaolin slurry produced by Georgia-Kaolin Company. This material comprises an aqueous slurry containing approximately 70% kaolinite clay solids and the viscosity is low due to the incorporation therein of about 0.3% by weight of sodium polyphosphate. The kaolinite clay particles in the slurry have a GE brightness at 457 millimicrons of 84–85%, an oil absorption of 37–41%, a surface area of about 10 square meters per gram, a dry bulk density of 22.66 pounds per gallon, and a particle size distribution of 85% less than 5 microns, 60% less than 2 microns and 40% less than 1 micron. The average particle diameter of the kaolinite clay in the WP grade slurry is about 1.4 microns.

Another clay material which has been found to be highly useful in connection with the present invention is a kaolinite clay designated Hydrite R by the manufacturer, Georgia-Kaolin Company. This clay is composed of hydrated aluminum silicates, and has a mean particle size of 0.77 microns, an oil absorption of 41% and a bulk density of 21.66 pounds per dry gallon. Yet another specific clay product which has been found to be operable is a clay designated SAF clay which is also sold and manufactured by Georgia-Kaolin Company. SAF clay is hydrated aluminum silicate kaolinite clay which in its dry form is identical to the clay utilized in the production of the WP clay slurry discussed above except that the SAF clay is dry and does not contain a polyphosphate dispersant. Thus, SAF clay has a larger particle size and presents a denser product than the Hydrite R discussed above.

With respect to the soap component of the present invention, this material must be a water-soluble soap and must be present in the slurry in sufficient amount to provide bridging and tieing between the charge sites on the kaolin clay particles and the tacky surfaces of the uncured articles to thereby adhere the layer of the kaolin clay particles to the tacky surfaces. In a broad sense, the soaps may comprise any alkali metal, alkaline earth metal or amine salt of an organic carboxylic acid having a molecule which contains at least 6 carbon atoms. The basic molecule may be saturated or unsaturated and may also contain other active groups such as hydroxyls. The soap itself does not necessarily have to be pure but may comprise a blend of various fatty acid soaps particularly to provide a desired titer and other such characteristics. As is the case in many industrial products which must be purchased from an outside source, the product may generally contain defoamers, dyes, perfumes, and/or synthetic surfactants without substantially altering the principal characteristics thereof.

Generally speaking, both high and medium titer soaps are operable in connection with the present invention. In this regard, titer is defined as the melting point of the fatty acid which is saponified to produce the soap in question and high titer soaps are those wherein the precursor fatty acid has a melting point of at least 30°C. The upper limit of the titer is not critical so long as the soap produced is substantially water soluble. Medium titer soaps are those wherein the precursor fatty acids have a melting point of at least −15° C or so and less than 30°C. The generally preferred soap for use in connection with the present invention is a soap designated Saratoga soap by its manufacturer, Proctor & Gamble Company. Saratoga soap is defined as an 88% high-titer tallow soap having a titer of approximately 42° C. This soap contains high percentages of saturated fatty acids such as stearic acid, palmitic acid and myristic acid and low percentages of unsaturated fatty acids such as oleic acid, linoleic acid, palmitoleic and myristoleic acid. This soap may also contain certain impurities such as moisture, sodium sulfate and sodium carbonate. Generally speaking, soaps produced by saponifying tallow-derived fatty acids are broadly useful in connection with the present invention and saponified mixtures of stearic and palmitic fatty acids having a titer of about 53°–54° C have also been found to have particular utility in connection with the present invention.

In summation, and not by way of limitation of any of the factors discussed above, the soap constituent may be produced by saponification of any convenient vegetable oil, animal fat or animal oil. These soaps may be produced during the preparation of the compositions themselves by saponification of a corresponding fatty acid or glyceride oil component present as an initial ingredient. By way of example, a number of operable fatty acids are disclosed by Louis F. Fieser and Mary Fieser, ORGANIC CHEMISTRY, 3rod Edition (1956) pp. 400, 401, Reinhold Publishing Corporation, New York, N.Y.

As mentioned above, the operable soaps include the alkali metal salts, alkaline earth metal salts and amine salts of appropriate fatty acids. In this connection, such salt can be produced, for example, by reacting the corresponding fatty acid with a base such as potassium hydroxide, sodium hydroxide, triethanolamine, diethanolamine, monoethanolamine and ammonia.

As has been set forth above, the preferred soap for use in connection with the present invention is Saratoga soap, a high titer soap described above. It has also been mentioned above that medium titer soaps are also operable and in this connection a soap designated Non-Pareil soap also manufactured by Proctor & Gamble is useful in connection with the present invention. The primary difference between the high titer soaps and the medium titer soaps is that the former perform well at higher temperatures in the order of 140°–160°F; however, sometimes at room temperatures the same fail to provide adequate leveling and bonding of the kaolin to the rubber. This may result in sticking and excessive dusting. Using a lower titer soap often serves to overcome such problems.

In accordance with the preferred form of the present invention, the weight ratio of clay particles to soap in the anti-stick compositions should be within the range of from 10:1 to 150:1. That is, the slurry should contain at least 10 times as much clay by weight as soap and operable compositions result even when the composition includes as much as 150 times as much clay by weight as soap.

One of the primary and principal advantages obtained through the use of the present invention is that in accordance therewith a concentrated composition can be prepared which is dilutable with water to present a coating for detackifying solid articles of uncured elastomeric materials initially having tacky surface characteristics. The concentrated compositions produced in accordance with the invention are capable of containing from about 50 to about 75% by weight of the finely divided particles of kaolin clay. More specifically, preferred commercial compositions contain from about 61 to about 70% by weight clay particles. In addition to the essential ingredients of the water-soluble soap and the kaolin clay particles, the concentrated composition may also include a sufficient amount of a dispersing and viscosity improving component to maintain the clay particles in suspension and maintain the viscosity of the slurry at a workable level, such that shipping expenses are minimized and the concentrated material is pourable from conventional shipping containers.

The preferred clay material fur use in connection with the present invention is WP grade kaolin slurry which is described above and consists of an aqueous slurry containing approximately 70% solids and 0.3% by weight sodium polyphosphate. This slurry is preferably mixed with an appropriate amount of Saratoga soap and hot water whereby the dispersion of kaolin particles is improved. The reason for this apparently is that the soap molecule with its inherent polarity is attracted to the charge sites on the kaolin particles that are not satisfied by the dispersing agent. This further counteracts any attraction between the kaolin particles whereby the dispersion itself is improved.

In its particularly and specifically preferred form, the concentrated composition of the present invention has the following formula:

TABLE I

| Component | Weight Percent |
| --- | --- |
| Water | 7.08 |
| Saratoga soap | 1.37 |
| Sodium sulfate | 0.75 |
| WP clay slurry | 90.80 |
| Total | 100.00 |

This formulation is produced by dissolving the Saratoga soap and the sodium sulfate in the water at a temperature of about 200°F. Equivalent quantities of the aqueous solution of soap and sodium sulfate and of the WP clay slurry are then metered into a mixing tank in such a manner that the ratio of ingredients in the mixing tank remains relatively constant. Mixing is accomplished in the mixing tank followed by pouring the resultant composition into drums. Manifestly, it would be obvious to one of ordinary skill in the art that the method of mixing could easily be automated thereby eliminating the need of a mixing tank by utilizing metering devices and in-line, high shear mixing equipment. It is pointed out particularly in connection with the foregoing formulation that the WP clay slurry contains too much polyphosphate to produce appropriate physical characteristics and accordingly it is desirable to incorporate the sodium sulfate into the formulation as a thickener for the purpose of increasing the viscosity and thixotropy of the concentrated composition. Other thickeners such as potassium sulfate, sodium carbonate, potassium carbonate or other sulfates or carbonates could also be used and it is pointed out that the routineer in this art should have no difficulty in selecting an appropriate thickener if the overall viscosity or thixotropy of the concentrated solution provides inappropriate handling characteristics.

Of course it should be appreciated that the composition set forth above is in a concentrated form and should preferably be diluted with water. In this connection, the slurry can be diluted such that a slurry having a solids content of 5% by weight is achieved and such dilute slurries have been found to be fully operable. However, preferably the slurry is diluted on the basis of about 7 to 1 by volume, that is, by adding 7 volumes of water to each volume of the slurry. This diluted composition may then be aplied to solid articles of uncured elastomeric materials initially having tacky surface characteristics for the purpose of coating and thereby detackifying the articles. The composition may be applied to the materials being treated by any customary liquid application process such as dipping, spraying or brushing, for example, this being followed by drying, to produce a coherent durable non-adhesive film. In conventional rubber pellet manufacturing equipment, the pellets are manufactured and ejected from the pellet making machinery in uncured form and a stream of the diluted composition may be aimed directly onto the stream of pellets as the latter are ejected from the pellet manufacturing equipment. These coated pellets may then be placed in a shaker while heat is applied for the purpose of drying the slurry composition thereon.

When the diluted aqueous slurry containing soap, kaolin clay particles, polyphosphate and sodium sulfate is sprayed onto the rubber pellets, the soap molecules actually act as a bridge between the kaolin particles and the rubber surface which tie the clay particles to the tacky surface. This phenomena causes the kaolin particles to coat or plate out on the tacky uncured rubber surfaces very efficiently and this in turn prevents sticking. Moreover, the attraction of the soap and the kaolin particles to the rubber is sufficiently strong to prevent substantial dusting. This result, as was set forth above, was entirely unexpected. The charge sites on the kaolinite apparently have a geometrical configuration which fits the geometrical configuration of the soap molecules whereby a very small quantity of soap is operable to adhere a relatively large quantity of kaolin particles to the uncured rubber particles. On the other hand, bentonite has a much higher charge and more numerous charge sites on its surface whereby a great deal more soap is required for adhering bentonite to the surface of uncured rubber particles. Accordingly, in accordance with the present invention, a slurry containing a relatively small amount of soap and a relatively large amount of kaolin particles presents an efficient coating for preventing sticking of the uncured articles and which is substantially dust free both during application and after drying.

Another operable formulation is produced utilizing an initially dry powdered kaolin clay material. In this instance the complete formula is as follows:

TABLE II

| Component | Percent By Weight |
|---|---|
| Water | 39.07 |
| Saratoga Soap | 1.37 |
| Darvan No. 1 | 0.95 |
| SAF clay | 58.61 |
| Total | 100.00 |

In this Example, hot water at 200°F is utilized and the soap and the Darvan No. 1 are dissolved therein. Darvan No. 1 is a material produced by R. T. Vanderbilt Company which consists of sodium salts of polymerized alkyl naphthalene sulfonic acids. This material serves a dual function in the formula by reducing the viscosity of the product and serving as a dispersing aid for maintaining the clay particles in suspension. Another similar and generally equivalent material is designated Tamol SN, a product of Rohm and Haas Company.

After the Saratoga soap and the Darvan No. 1 are dissolved in the hot water, the clay is mixed therein using a large mixing tank and a high speed mixer. The greatest difficulty in connection with the preparation of this formula is that the handling of powdered clay in bags or in a bulk system is required and therefore dusting is a problem and mixing time is greater than when a pre-mixed slurry is used. However, the concentrated composition produced is fully acceptable and in commercial application works identically with the formula described above wherein the WP clay slurry was utilized. In this connection it is pointed out again that the SAF clay is the same clay which is utilized in the WP clay slurry, the only difference being the inclusion of a sufficient amount of water to slurrify the clay and the inclusion of 0.3% sodium polyphosphate to reduce the viscosity.

It is mentioned once again that while each of the above formulations includes preformed Saratoga soap, it is entirely possible within the broad concepts of the present invention to produce the soap by saponifying an appropriate fatty acid component. This of course merely adds an additional process step which should be well within the capabilities of one of ordinary skill in the art to which the present invention pertains. Typically, such saponification merely requires neutralization of the fatty acid in an aqueous medium by adding an appropriate base such as an alkali metal hydroxide or an amine.

When powdered clays are used, in addition to the dusting and handling problems, it is also generally necessary to add a small amount of a dispersant such as sodium polyphosphate or the like to increase the total amount of clay which can be maintained in dispersion.

In addition to the foregoing, there are several other additives which could be introduced into the product for specific purposes. Included among these are rust inhibitors such as sodium nitrite, ammonia, morpholine, triethanolamine, cyclohexylamine, dicyclohexylamine, silicates, chromates, phosphate-esters, and/or alkanol amides. Bactericides such as phenolics may also be added to prevent bacterial attack of the soaps. Defoamers such as silicone and non-silicone defoamers could be added to reduce or completely eliminate foam formation. Moreover, wetting agents such as ethoxylated alkylphenols, ethoxylated linear alcohols, ethoxylated fatty acids, alkylaryl sulfonates, phosphate esters, alkyl ether sulfates and the like may be utilized to provide a more even coating over the rubber surfaces.

One of the primary considerations for any composition to be used for coating and thereby detackifying solid articles of uncured elastomeric materials initially having tacky surface characteristics, is that the surface coating itself be compatible with the final product to be produced. In the present instance, it has unexpectedly been found that not only are the components of the composition of the present invention completely compatible with rubber articles to be produced from uncured rubber pellets, but the same actually operate to increase the adhesion of rubber to steel cords of the type utilized in the production of automobile tires.

The specific advantages obtained through the use of the present invention, in its preferred form, is that the handling of dry clays is avoided whereby there is no danger of dusting either during mixing or after the rubber pellets have been coated and dried. Further, the even coating of kaolin clay provided substantially completely eliminates the sticking of the rubber pellets to one another. Moreover, the coating of clay sticks to the rubber pellets tenaciously and the danger of flaking off is substantially eliminated. The coating compositions of the present invention are extremely stable whereby substantial settling during shipment does not occur and neither does sludging in operation equipment such as circulating tanks. The composition is compatible with rubber and does not interfere with subsequent operations such as molding, forming or bonding and it has been found that when the coated articles are subjected to heating and curing the coating is totally absorbed into the finished article without substantially altering the properties of the latter.

The solids contents of the concentrated composition is preferably within the range of 61–70% by weight whereby shipping costs are reduced and yet the same are still fully pourable from the bung holes of conventional shipment drums. Moreover, the concentrated compositions can be diluted to an extent such that the diluted composition contains only 5% solids while remaining fully operable. The coating compositions of the present invention have been found to be particularly useful in connection with rubber stocks containing a high percentage of oil and also in connection with 100% crude rubber stock.

We claim:

1. A liquid composition for coating and thereby detackifying solid articles of uncured elastomeric materials initially having tacky surface characteristics, said composition comprising an aqueous slurry consisting essentially of:
   a substantial proportion of finely divided particles of a kaolin clay;
   a sufficient amount of a water-soluble soap to provide bridging and tieing between the charge sites on the kaolin particles and the tacky surfaces of the uncured articles to thereby adhere a layer of kaolin particles to the tacky surfaces; and
   a sufficient amount of water to disperse said clay particles.

2. A composition as set forth in claim 1 wherein said soap is selected from the group consisting of alkali metal salts, alkaline earth metal salts and amine salts of organic carboxylic acids having at least six carbon atoms and mixtures thereof.

3. A composition as set forth in claim 1 wherein said kaolin clay is selected from the group consisting of kaolinite, nacrite, dickite and halloysite.

4. A composition as set forth in claim 1 wherein the weight ratio of clay particles to soap in said slurry ranges from 10:1 to 150:1.

5. A composition as set forth in claim 2 wherein said soap basically comprises a saponified tallow component.

6. A composition as set forth in claim 2 wherein said soap is an 88% high-titer tallow soap having a titer of approximately 42°C.

7. A composition as set forth in claim 3 wherein said clay is kaolinite.

8. A composition as set forth in claim 6 wherein said clay is kaolinite.

9. A composition as set forth in claim 8 wherein the weight ratio of clay particles to soap in said slurry ranges from 10:1 to 150:1.

10. A composition as set forth in claim 9 wherein said slurry includes at least about 5 weight percent of said kaolinite.

11. A concentrated composition dilutable with water to present a coating for detackifying solid articles of uncured elastomeric materials initially having tacky surface characteristics, said composition comprising an aqueous slurry containing:
    50 to 75 percent by weight of finely divided particles of kaolin clay;
    a sufficient amount of a water-soluble soap to provide bridging and tieing between the charge sites on the kaolin particles and the tacky surfaces of the uncured particles to thereby adhere a layer of kaolin particles to the tacky surfaces; and
    a sufficient amount of water to make-up the remainder of the composition.

12. A concentrated composition as set forth in claim 11 wherein said composition includes a sufficient amount of a dispersing and viscosity improving component to maintain said clay particles in suspension and maintain the viscosity of the slurry at a workable level.

13. A composition as set forth in claim 12 wherein said slurry contains approximately 61 to 70 percent by weight of said clay and has a specific gravity of approximately 1.5 to 1.56.

14. A composition as set forth in claim 11, wherein said aqueous slurry contains approximately 0.5 to 5.0 weight percent of said soap and approximately 20 to 49.5 weight percent water.

15. A composition as set forth in claim 11 wherein said soap is selected from the group consisting of alkali metal salts, alkaline earth metal salts and amine salts of organic carboxylic acids having at least six carbon atoms and mixtures thereof.

16. A composition as set forth in claim 11 wherein said kaolin clay is selected from the group consisting of kaolinite, nacrite, dickite and halloysite.

17. A composition as set forth in claim 11 wherein the weight ratio of clay particles to soap in said slurry ranges from 10:1 to 150:1.

18. A composition as set forth in claim 16 wherein said clay is kaolinite.

19. A composition as set forth in claim 2 wherein said soap is derived from a fatty acid component having a titer of at least −15°C.

20. A composition as set forth in claim 19 wherein said soap is derived from a fatty acid component having a titer in the range of from about 40° to 55°C.

21. A composition as set forth in claim 15 wherein said soap is derived from a fatty acid component having a titer of at least −15°C.

22. A composition as set forth in claim 21 wherein said soap is derived from a fatty acid component having a titer in the range of from about 40° to 55°C.

23. A composition as set forth in claim 21 wherein said soap basically comprises a saponified tallow component.

24. A composition as set forth in claim 21 wherein said soap is an 88% high-titer tallow soap having a titer of approximately 42°C.

25. A composition as set forth in claim 24 wherein said clay is kaolinite.

26. A composition as set forth in claim 25 wherein the weight ratio of clay particles to soap in said slurry ranges from 10:1 to 150:1.

27. A concentrated composition as set forth in claim 26 wherein said composition includes a sufficient amount of a dispersing and viscosity improving component to maintain said clay particles in suspension and maintain the viscosity of the slurry at a workable level.

28. A composition as set forth in claim 27 wherein said slurry contains approximately 61 to 70 percent by weight of said clay and has a specific gravity of approximately 1.5 to 1.56.

29. A composition as set forth in claim 28 wherein said aqueous slurry contains approximately 0.5 to 5.0 weight percent of said soap and approximately 25 to 38.5 weight percent water.

* * * * *